United States Patent
Benz et al.

(10) Patent No.: US 10,167,739 B2
(45) Date of Patent: Jan. 1, 2019

(54) CENTERING ARRANGEMENT OF TWO PARTS RELATIVE TO EACH OTHER

(71) Applicant: ANSALDO ENERGIA SWITZERLAND AG, Baden (CH)

(72) Inventors: Urs Benz, Gipf-Oberfrick (CH); Paul Marlow, Baden (CH); Jost Imfeld, Scherz (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 243 days.

(21) Appl. No.: 15/003,729

(22) Filed: Jan. 21, 2016

(65) Prior Publication Data
US 2016/0215655 A1   Jul. 28, 2016

(30) Foreign Application Priority Data
Jan. 22, 2015  (EP) .................................. 15152157

(51) Int. Cl.
*F01D 25/28* (2006.01)
*F01D 25/26* (2006.01)
*F16D 1/08* (2006.01)

(52) U.S. Cl.
CPC ............ *F01D 25/28* (2013.01); *F01D 25/26* (2013.01); *F16D 1/0835* (2013.01); *F05D 2230/644* (2013.01); *F05D 2300/501* (2013.01); *F05D 2300/5021* (2013.01)

(58) Field of Classification Search
CPC ........ F01D 25/26; F01D 25/28; F16D 1/0835; F05D 2230/644; F05D 2300/501; F05D 2300/5021
See application file for complete search history.

(56) References Cited

U.S. PATENT DOCUMENTS

| 6,126,130 A | 10/2000 | Planck |
| 7,220,097 B2 * | 5/2007 | Boeck ................... F01D 11/20 415/14 |
| 7,686,575 B2 | 3/2010 | Chehab et al. |

(Continued)

FOREIGN PATENT DOCUMENTS

| DE | 199 61 451 A1 | 6/2001 |
| DE | 10 2007 032655 A1 | 1/2009 |

(Continued)

OTHER PUBLICATIONS

Extended European Search Report dated Jan. 7, 2015, issued by the European Patent Office in the corresponding European Patent Application No. 15152157.2-1610. (6 pages).

*Primary Examiner* — Igor Kershteyn
(74) *Attorney, Agent, or Firm* — Buchanan Ingersoll & Rooney PC

(57) ABSTRACT

A centering arrangement includes a ring-like inner part and a ring-like outer part, whereby the outer part surrounds the inner part in a concentric arrangement and with an interspace established between the outer part and the inner part, and whereby the outer part and the inner part are subject to a differential radial expansion. A centering contact element, procures a centering mechanical contact between the outer part and the inner part at a plurality of circumferentially distributed contact points, and is able to deform in order to compensate for differential radial expansion.

10 Claims, 3 Drawing Sheets

(56) References Cited

U.S. PATENT DOCUMENTS

| | | | |
|---|---|---|---|
| 8,911,204 B2 * | 12/2014 | Davis | F02C 3/113 29/402.03 |
| 2010/0209183 A1 | 8/2010 | Fugel et al. | |
| 2014/0241876 A1 | 8/2014 | Schaefer et al. | |
| 2015/0217385 A1 * | 8/2015 | Haimer | B23C 5/26 279/133 |

FOREIGN PATENT DOCUMENTS

| | | |
|---|---|---|
| EP | 2 772 617 A1 | 9/2014 |
| WO | WO 2014/023778 A1 | 2/2014 |

* cited by examiner

CENTERING ARRANGEMENT OF TWO PARTS RELATIVE TO EACH OTHER

BACKGROUND OF THE INVENTION

The present invention relates to the field of mechanical engineering. It refers to centering arrangement according to the preamble of claim 1.

PRIOR ART

In gas turbines with inner and outer casings there is often the problem of centering of two parts with differential radial expansion. Reasons are that parts are produced from different materials with different expansion coefficients, and/or operate at different temperatures, and/or transiently operate at different temperatures.

In the prior art radial keys where introduced to cope with this problem.

Document U.S. Pat. No. 7,686,575 B2 discloses an inner mounting ring for gas turbine flow path components such as shroud ring segments. The inner ring may be mounted to an outer ring on radially slidable mounts that maintain the two rings in coaxial relationship, but allows them to thermally expand at different rates. This allows matching of the radial expansion rate of the inner ring to that of the turbine blade tips, thus providing reduced clearance between the turbine blade tips and the inner surface of the shroud ring segments under all engine operating conditions. The inner ring may be made of a material with a lower coefficient of thermal expansion than that of the outer ring.

Document EP 2 772 617 A1 refers to a rotary flow machine comprising a rotor unit, rotating about a rotational axis, around which in at least one partial axial area a stationary inner housing is provided at a radial distance which can be divided up along the rotational axis in an upper and a lower inner housing half which adjoin each other along a horizontal split plane, said inner housing being surrounded in at least one axial section by an outer housing which can be divided up along the rotational axis in one upper and one lower outer housing half. The lower inner housing half provides support means which support the inner lower housing half on the lower outer housing half, and said support means are detachably mounted at the lower inner housing half at least at two opposite support positions relative to the rotational axis along the split plane.

The disadvantages of these solutions are:
A larger interface is required;
An increased number of parts is necessary; and
There is longer assembly time and higher cost.

In other technical fields there are different solution for certain centering problems disclosed.

Document U.S. Pat. No. 6,126,130 discloses a device for bracing two components has a spring ring, which is designed to be corrugated in each case in the radial, and the axial direction. The spring ring can be compressed axially or radially, without, in each case, losing its spring effect in the other direction. It is particularly advantageous for the spring ring to be used for bracing a fuel pump of an automobile in a feed unit.

WO 2014/023778 A1 describes a centering device for centrally chucking a rotary tool comprising a socket on a mandrel of a tool holder. A tool arrangement comprises a tool holder that includes a mandrel, and comprises a rotary tool that is placed on the tool holder and includes a socket. In order to create a universal centering device that is easy to manufacture and can be used for a multitude of internal chucking units, and create a tool arrangement in which the rotary tool can be centered with high accuracy on the internal chucking unit, the centering device is designed as a closed centering ring which can be inserted between the rotary tool and the mandrel and which has an elastically deformable contour, and such a centering device is disposed between the mandrel and the rotary tool in the tool arrangement.

SUMMARY OF THE INVENTION

It is an object of the present invention to provide a centering arrangement for concentric parts with differential radial expansion that is simple and effective and can be adapted to inner and outer casings of a turbo machine.

This and other objects are obtained by a centering arrangement according to claim 1.

According to the invention a centering arrangement comprises a ring-like inner part and a ring-like outer part, whereby said outer part surrounds said inner part in a concentric arrangement and with an interspace established between said outer part and said inner part, and whereby said outer part and said inner part are subject to a differential radial expansion.

It is characterized in that a centering contact element is provided, which procures a centering mechanical contact between said outer part and said inner part at a plurality of circumferentially distributed contact points, and which is able to deform in order to compensate for said differential radial expansion.

According to an embodiment of the invention said centering contact element is one of said outer part and inner part itself.

Specifically, said centering contact element is said inner part itself.

More specifically, said inner part has a circular inner contour and a polygonal outer contour, and that said outer part has a circular inner contour.

According to another embodiment of the invention said centering contact element is a corrugated intermediate ring placed in said interspace between said outer part and said inner part.

Specifically, said outer part has a circular inner contour, and said inner part has a circular outer contour.

More specifically, said outer part has a non-circular inner contour, and said inner part has a non-circular outer contour, whereby said non-circular inner contour of said outer part and said non-circular outer contour of said inner part match with the corrugations of said corrugated intermediate ring.

Even more specifically, said inner part has a circular inner contour.

Specifically, said corrugated intermediate ring has a circumferential gap.

According to just another embodiment of the invention said centering contact element is able to deform elastically during said differential radial expansion.

According to a further embodiment of the invention said outer part and said inner part are an outer casing and an inner casing of a turbo machine, especially a gas turbine.

BRIEF DESCRIPTION OF THE DRAWINGS

The present invention is now to be explained more closely by means of different embodiments and with reference to the attached drawings.

DETAILED DESCRIPTION OF DIFFERENT EMBODIMENTS OF THE INVENTION

One preferred application of the centering scheme according to the invention is a turbo machine, especially gas turbine, where inner and outer casings must be centered and kept centered under differential radial expansion conditions that may be permanent or caused by transient states during operation.

Figure 1:
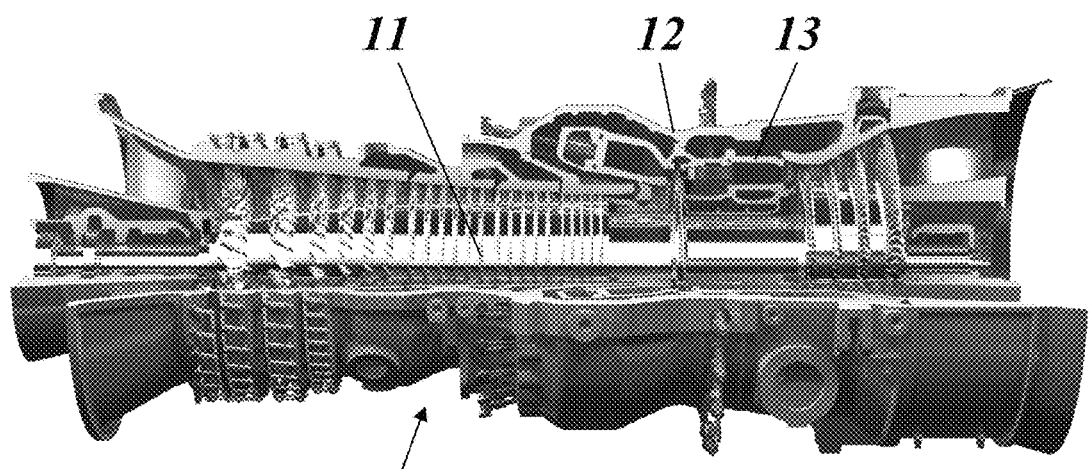
FIG. 1 shows a gas turbine of the type GT26 comprising an outer casing and an inner casing, which is surrounded by said outer casing and is an example for an arrangement, which has to be centered due to differential thermal expansion.

FIG. 1 shows an example of a stationary gas turbine 10 with a rotor 11, an inner casing 12 and an outer casing 13, with the inner casing 12 is concentrically surrounded by the outer casing 13.

However, the invention is not limited to turbo machines but may be applied more generally in all cases, where two concentric parts are subject to a differential radial expansion.

Figure 2:
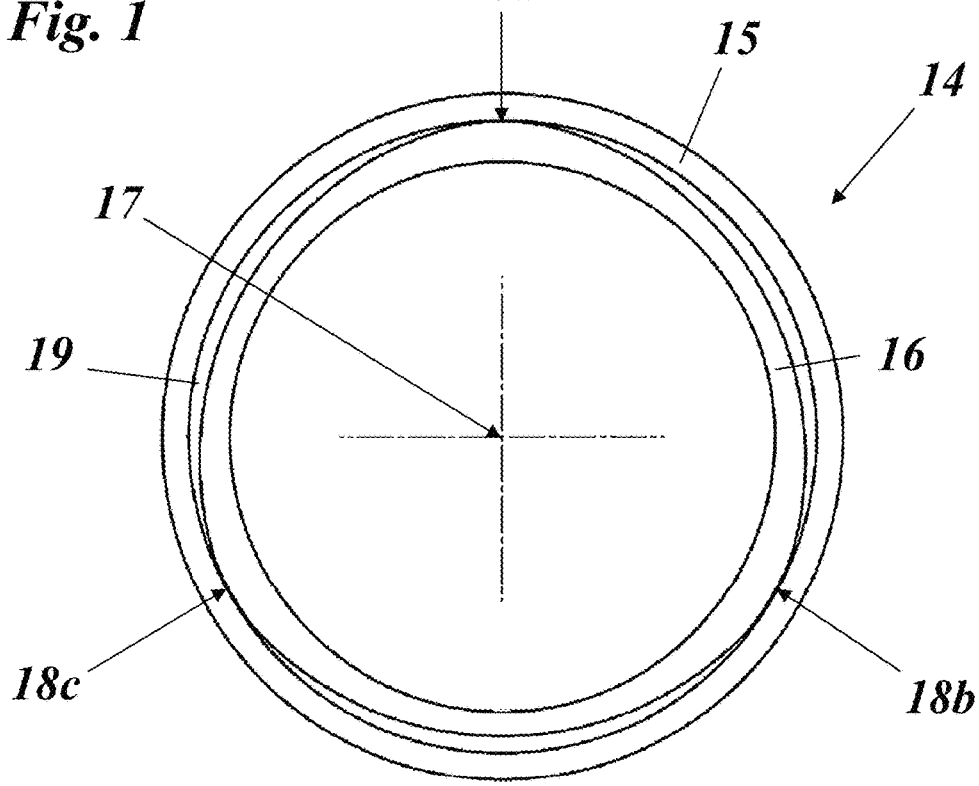
FIG. 2 shows in an axial view an arrangement of an inner part within a surrounding outer part according to an embodiment of the invention, whereby one of the interfaces between inner and outer part is of polygonal shape.

A first such application is shown in FIG. 2. The centering arrangement 14 is between a ring-like inner part 16 and a surrounding ring-like outer part 15, which parts are concentric with respect to a central axis 17. An interspace 19 is provided between inner part 16 and outer part 15.

While the inner contour of inner part 16 is circular, the outer contour is of polygonal shape with 3 or more circumferentially distributed mechanical contacts 18a-c between inner part 16 and outer part 15, or vice versa. At least one of the parts 15, 16 is sufficiently thin and flexible at the interface to be able to deform elastically, or with sufficient lifetime in plastic range, during differential radial expansion.

If both parts are not sufficiently elastic at the interface, an intermediate ring can be introduced. The intermediate ring has a corrugated shape with 3 or more contacts to each part. The corrugated ring at the interface is sufficiently thin and flexible to be able to deform elastically, or with sufficient lifetime in plastic range, during differential radial expansion of the two parts. The corrugated ring can also be cut to have a circumferential gap in order to increase its flexibility. The spacing of the split ring corrugations can be varied to achieve uniform stiffness in all radial directions.

Figure 3:
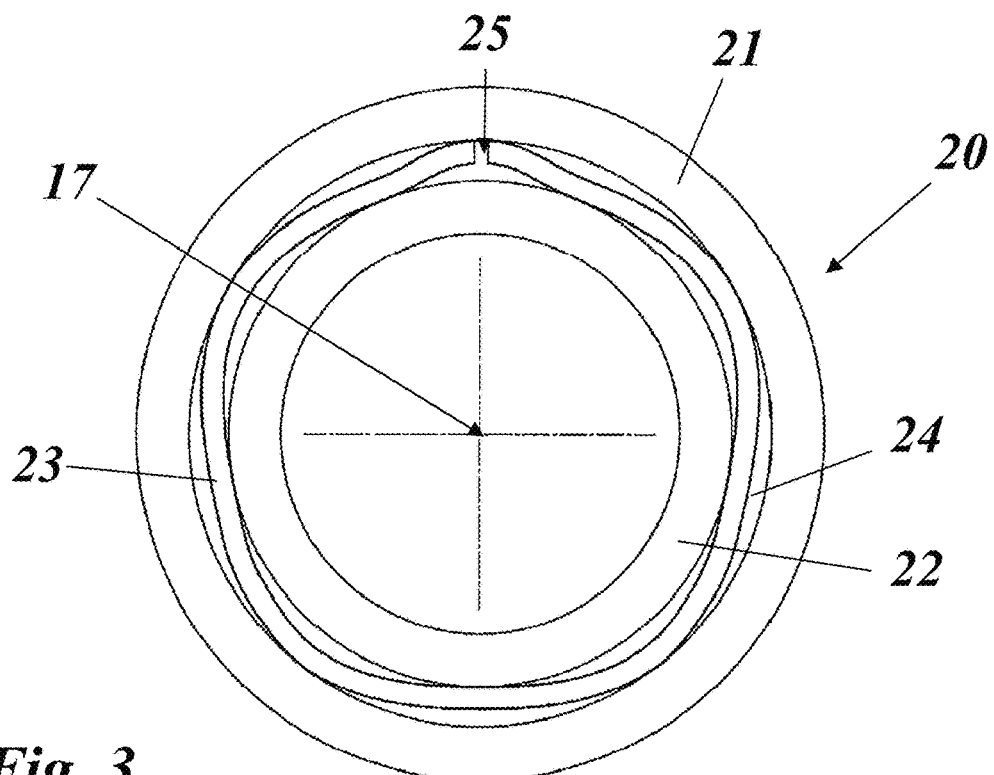
FIG. 3 shows in an axial view an arrangement of an inner part within a surrounding outer part according to another embodiment of the invention, whereby a corrugated intermediate ring is provided in a ring-like interspace between inner and outer part.

FIG. 3 shows an embodiment with a corrugated intermediate ring 23 with circumferential gap 25 provided in an interspace 24 between a fully circular inner part 22 and a fully circular outer part 21, thereby having more than three mechanical contacts between intermediate ring 23 and inner and outer part 22 and 21, respectively.

Figure 4:
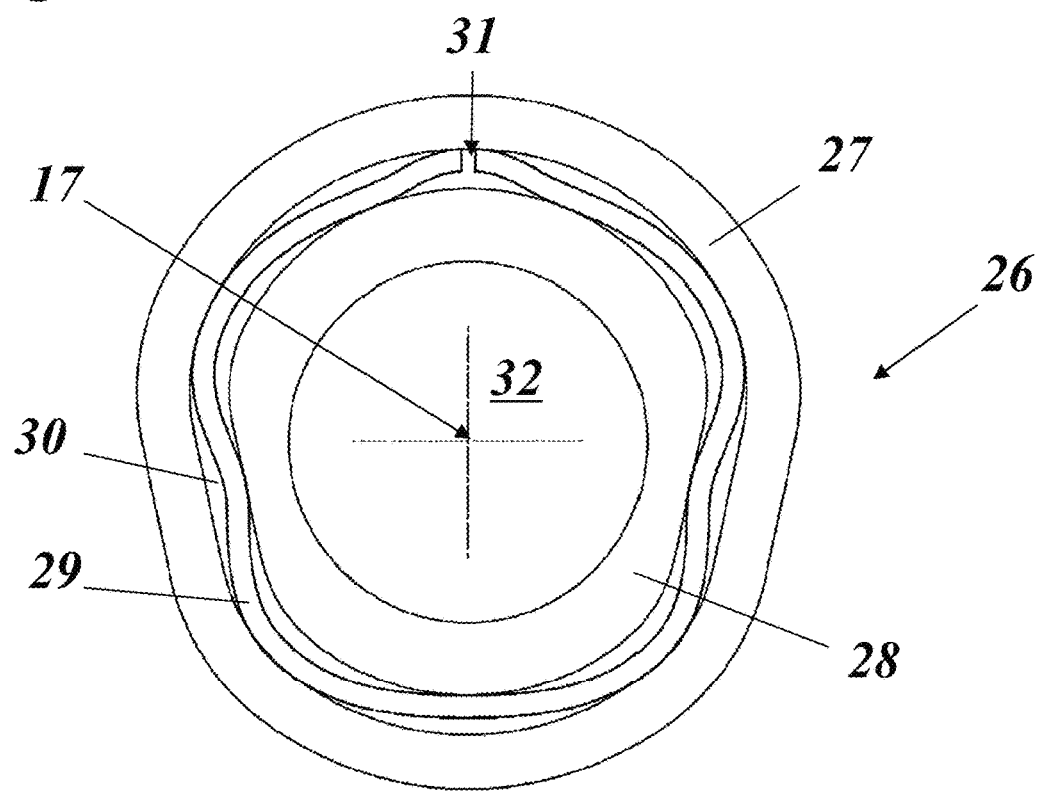
FIG. 4 shows in an axial view an arrangement of an inner part within a surrounding outer part according to another embodiment of the invention, whereby both interfaces between inner and outer part are of non-round shape and a corrugated intermediate ring is provided in a non-round ring-like interspace between inner and outer part.

FIG. 4 shows another embodiment with a corrugated intermediate ring 29 provided in an interspace 30 between a partly circular inner part 28 and a fully non-circular outer part 27. Again, the intermediate ring 29 has a circumferential gap 31. Thus, the embodiment of FIG. 4 uses both concepts shown in FIG. 2 and FIG. 3.

The advantages of these centering arrangements are:
Smaller space requirement at the centralizing interface;
reduced number of parts; and
quicker assembly and disassembly times and reduced cost.

Figure 5:
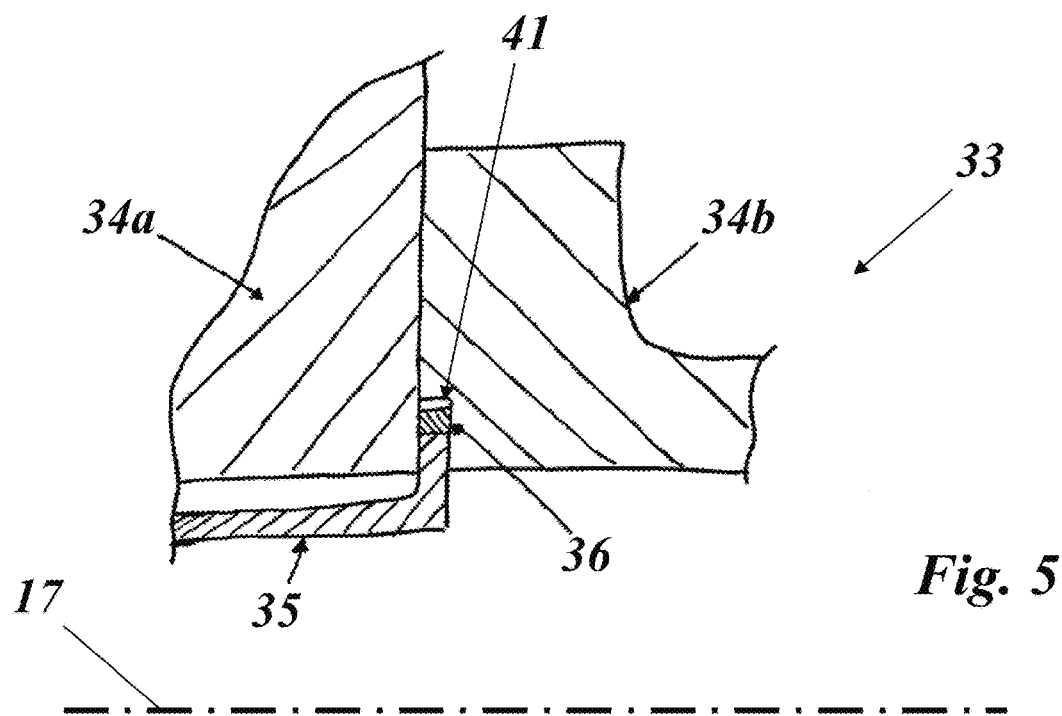
FIG. 5 shows a longitudinal section of a two-part outer casing (e.g. of a gas turbine) surrounding an axially fixing an inner casing, whereby an intermediate ring is provided in an interspace between one outer casing part and inner casing according to another embodiment of the invention.
Figure 6:
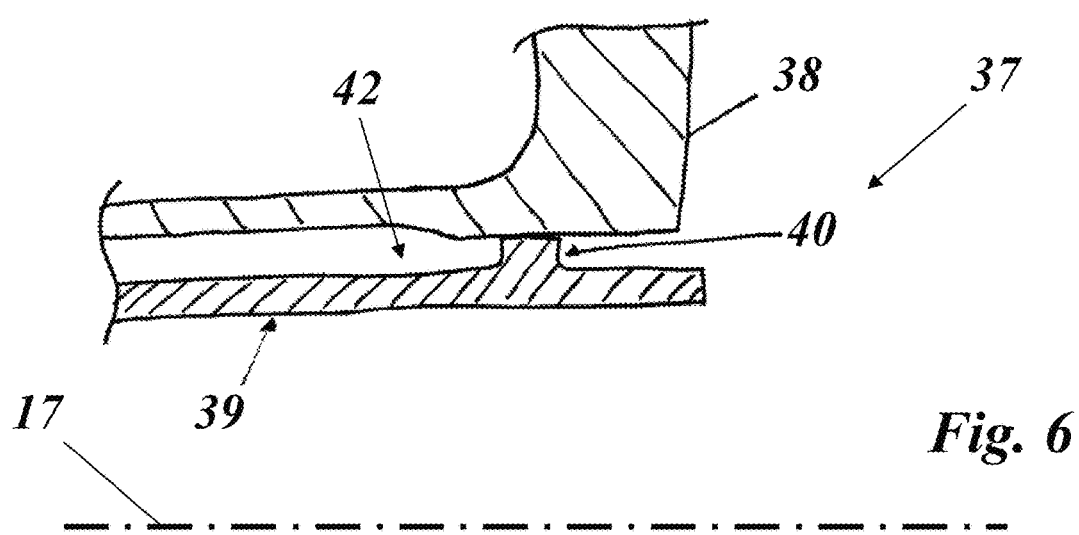
FIG. 6 shows a longitudinal section of an outer casing (e.g. of a gas turbine) surrounding an inner casing, whereby said inner casing has a thin polygonal interface as centering means according to another embodiment of the invention.

FIGS. 5 and 6 relate to the application of the new centering scheme to the casings of a turbo machine, especially gas turbine.

In FIG. 5, centering arrangement 33 is between first and second outer casings 34a and 34b, respectively, and an inner casing 35. In a ring-like interspace 41 between first and second outer casings 34a and 34b and inner casing 35 a corrugated intermediate ring 36 similar to FIG. 3 is provided, which keeps the flanged inner casing 35 in a centered relationship to the outer casings 34a,b even when a differential radial expansion occurs, for example during transient states.

In FIG. 6, centering arrangement 37 comprises an inner casing 39 and a surrounding outer casing 38, whereby the interspace 42 between both casings is bridged by a polygonal ring 40 formed as part of the inner casing 40, similar to FIG. 2.

LIST OF REFERENCE NUMERALS 10 gas turbine (e.g. GT26)
11 rotor
12 inner casing
13 outer casing
14,20,26 centering arrangement
15,21,27 outer part
16,22,28 inner part
17 axis
18a-c contact
19 interspace
23,29 intermediate ring
24,30 interspace
25,31 gap
32 inner space
33,37 centering arrangement (e.g. gas turbine)
34a,b outer casing
35 inner casing
36 intermediate ring
38 outer casing
39 inner casing
40 polygonal ring
41,42 interspace

The invention claimed is:
1. Centering arrangement comprising:
a ring-like inner part and a ring-like outer part, whereby said outer part surrounds said inner part in a concentric arrangement and with an interspace established between said outer part and said inner part, and whereby said outer part and said inner part are subject to a differential radial expansion; and a centering contact element, which procures a centering mechanical contact between said outer part and said inner part at a plurality of circumferentially distributed contact points, and which is deformable in order to compensate for differential radial expansion, wherein the centering contact element is a part of the outer part or the inner part.

2. Centering arrangement as claimed in claim 1, wherein said centering contact element is said inner part.

3. Centering arrangement as claimed in claim 2, wherein said inner part has a circular inner contour and a polygonal outer contour, and said outer part has a circular inner contour.

4. Centering arrangement as claimed in claim 1, wherein said centering contact element is a corrugated intermediate ring placed in said interspace between said outer part and said inner part.

5. Centering arrangement as claimed in claim 4, wherein said outer part has a circular inner contour, and said inner part has a circular outer contour.

6. Centering arrangement as claimed in claim 4, wherein said outer part has a non-circular inner contour, and said inner part has a non-circular outer contour, whereby said non-circular inner contour of said outer part and said non-circular outer contour of said inner part match with the corrugations of said corrugated intermediate ring.

7. Centering arrangement as claimed in claim 6, wherein said inner part has a circular inner contour.

8. Centering arrangement as claimed in claim 4, wherein said corrugated intermediate ring has a circumferential gap.

9. Centering arrangement as claimed in claim 1, wherein said centering contact element is deformable elastically during said differential radial expansion.

10. Centering arrangement as claimed in claim 1 in combination with a turbo machine, wherein said outer part and said inner part are an outer casing and an inner casing of the turbo machine.

\* \* \* \* \*